United States Patent
Rafaeli (10) Patent No.: US 7,738,612 B2
(45) Date of Patent: Jun. 15, 2010

(54) SYSTEMS AND METHODS FOR IMPLEMENTING ADVANCED POWER LINE SERVICES

(75) Inventor: Rami Rafaeli, Kfar Saba (IL)

(73) Assignee: Main.Net Communications Ltd., RaAnana (IL)

(*) Notice: Subject to any disclaimer, the term of this patent is extended or adjusted under 35 U.S.C. 154(b) by 192 days.

(21) Appl. No.: 11/938,890

(22) Filed: Nov. 13, 2007

(65) Prior Publication Data

US 2008/0112474 A1 May 15, 2008

Related U.S. Application Data

(60) Provisional application No. 60/865,453, filed on Nov. 13, 2006, provisional application No. 60/888,771, filed on Feb. 8, 2007.

(51) Int. Cl.
*H04L 7/00* (2006.01)

(52) U.S. Cl. .................. 375/354; 375/222; 455/402; 340/538

(58) Field of Classification Search .............. 375/222, 375/354; 455/402; 340/538
See application file for complete search history.

(56) References Cited

U.S. PATENT DOCUMENTS

| 6,927,672 | B2 | 8/2005 | Zalitzky et al. | |
|---|---|---|---|---|
| 6,995,657 | B2 | 2/2006 | Zalitzky et al. | |
| 7,231,280 | B2* | 6/2007 | Costa | 700/286 |
| 2004/0037317 | A1 | 2/2004 | Zalitzky et al. | |
| 2004/0174851 | A1 | 9/2004 | Zalitzky et al. | |
| 2004/0240451 | A1* | 12/2004 | Lee et al. | 370/395.5 |
| 2004/0264501 | A1 | 12/2004 | Zalitzky et al. | |
| 2005/0008028 | A1 | 1/2005 | Efrati et al. | |
| 2006/0077047 | A1 | 4/2006 | Zalitzky et al. | |
| 2008/0112473 | A1* | 5/2008 | Refaeli et al. | 375/222 |

* cited by examiner

*Primary Examiner*—Ted M Wang (57) ABSTRACT

A system and method is herein provided to implement advanced power line communication services. The system may include, for example, a power line modem fitted with BPL core hardware components and BPL core software components, the modem further fitted with a plurality of application specific APIs; and a network management software (NMS) unit adapted to remotely manage the application modules in the power line modem.

18 Claims, 4 Drawing Sheets

SYSTEMS AND METHODS FOR IMPLEMENTING ADVANCED POWER LINE SERVICES

CROSS REFERENCE TO RELATED APPLICATIONS

This application claims the benefit of U.S. Patent Application 60/865,453, filed Nov. 13, 2006, entitled "Apparatus, systems and methods for providing power line communication services", and from U.S. Patent Application 60/888,771, filed Feb. 8, 2007, entitled "Systems and methods for implementing an intelligent electric grid", which are incorporated in its entirety herein by reference.

FIELD AND BACKGROUND OF THE INVENTION

Power line communication (PLC) systems have been in use for several decades, attempting to bring greater bandwidth and services to users, to compete with other communications technologies. Broadband over power lines (BPL) is the use of PLC technology to provide broadband Internet access through ordinary power lines. Development of BPL technologies, in the sense of delivering broadband communication across a power line network, has been a field where significant progress has been made, however, the race is still on to find efficient and effective ways to deliver a multitude of additional services to users.

One of the popular areas under development these days are services and applications that can be used to help manage and maintain electric grids run by Utilities. In response to the above trends, typically, PLC technologies have provided systems that include a plurality of communications modems, which are used to communicate in order to form a communications network. These modems are in general setup to facilitate communications, and in some cases may be updated using hardware and/or software to modify their features and possibilities to operate. Obviously, with networks growing in size it becomes increasingly unfeasible to make such changes to the modems, therefore typically, PLC networks are fairly closed to change until next generation modems are provided.

There is a great need for a power line management system and method that could facilitate intelligent network management, for example, to provide advanced services to users of communications modems.

SUMMARY OF THE INVENTION

Embodiments of the present invention relate to systems, apparatuses, and methods to provide advanced power line communication services.

In some embodiments, a system is provided for implementing power line communication services, comprising a power line modem fitted with BPL core hardware components and BPL core software components, said modem further fitted with a plurality of application specific APIs; and a network management software (NMS) unit adapted to remotely manage application modules in said power line modem.

The power line modem includes an interface for enabling coupling of one or more hardware components to the modem.

The interface may be adapted to connect said modem to one or more communication components selected from the group consisting of WiFi, Zigbee, Bluetooth, Infrared, RfID, splitters and more.

The API's are selected from one or more of a group consisting of QOS, routing, healing, repetition, AMR, VoIP, enhanced TCP, intelligent grid management, videoing gaming and more.

The NMS may include a grid management module to enable intelligent management of an electric grid.

The NMS may include a licensing module to manage usage of applications by the power line modem.

The NMS may include a customization module to determine the specific usage of applications on a per user basis.

The NMS may include executable code adapted to be downloaded to the modems to enable running of the hardware components.

The NMS may include executable code adapted to be downloaded to the modems to enable running of the software components.

A method is provided, according to some embodiments, for implementing power line communication services, comprising: providing a power line modem fitted with BPL core hardware components and BPL core software components, the modem further fitted with a plurality of application specific APIs; Providing a network management software (NMS) unit adapted to manage application modules in the power line modem; Upon request, downloading an executable file from the NMS to the modem; and running the executable file to implement an application.

The executable file may be an intelligent grid management application.

The method may include verifying a licensing arrangement before running the executable file.

A method is provided, according to some embodiments, for implementing power line communication services, comprising: providing a power line modem fitted with BPL infrastructure hardware components; an interface for enabling coupling of one or more hardware components to the modem, and BPL infrastructure software components, wherein the modem may be further fitted with a plurality of application specific APIs; providing a network management software (NMS) unit adapted to manage application modules in the power line modem; coupling a hardware component to the interface; downloading an executable file from the NMS to the modem, the executable file adapted to run an application based on usage of the hardware component; and running the executable file to implement an application.

The hardware component may be a communication component selected from the group consisting of WiFi, Zigbee, Bluetooth, Infrared, RfID, splitters and more.

A method is provided, according to some embodiments, for providing intelligent management of a BPL grid, comprising: Providing a power line modem fitted with BPL infrastructure hardware components and BPL infrastructure software components, where the modem may be further fitted with an intelligent grid management application API; and Providing a network management software (NMS) unit adapted to manage the intelligent grid management in the power line modem, the NMS including code adapted to remotely manage an intelligent grid management application in the modem.

The method may further include downloading an executable file from the NMS to the modem; and running the executable file to implement the intelligent grid management application.

A system is provided, according to some embodiments, for providing intelligent management of a BPL grid, comprising: A power line modem fitted with BPL infrastructure hardware components and BPL infrastructure software components, the modem further fitted with an intelligent grid management application API; and A network management software (NMS) unit adapted to manage the intelligent grid management in the power line modem, the NMS including code adapted to manage an intelligent grid management application in the modem.

The system may also include a licensing module coupled to the NMS, to enable customized management of the intelligent grid management application.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

In the following detailed description, numerous specific details are set forth in order to provide a thorough understanding of the present invention. However, it will be understood by those skilled in the art that the present invention may be practiced without these specific details.

Embodiments of the present invention enable implementation and management of a Broadband Power Line (BPL) System that may provide a variety of advanced services and applications using a power line grid or network. In some embodiments such advanced services and applications may be remotely implemented, thereby enabling a PLC network to be adapted, modified, updated and otherwise managed using software driven commands. BPL services and applications may be provided for electric grids that may include electric power stations, solar power plants, hydro power stations, wind power stations, or any other power grid elements.

Figure 1:
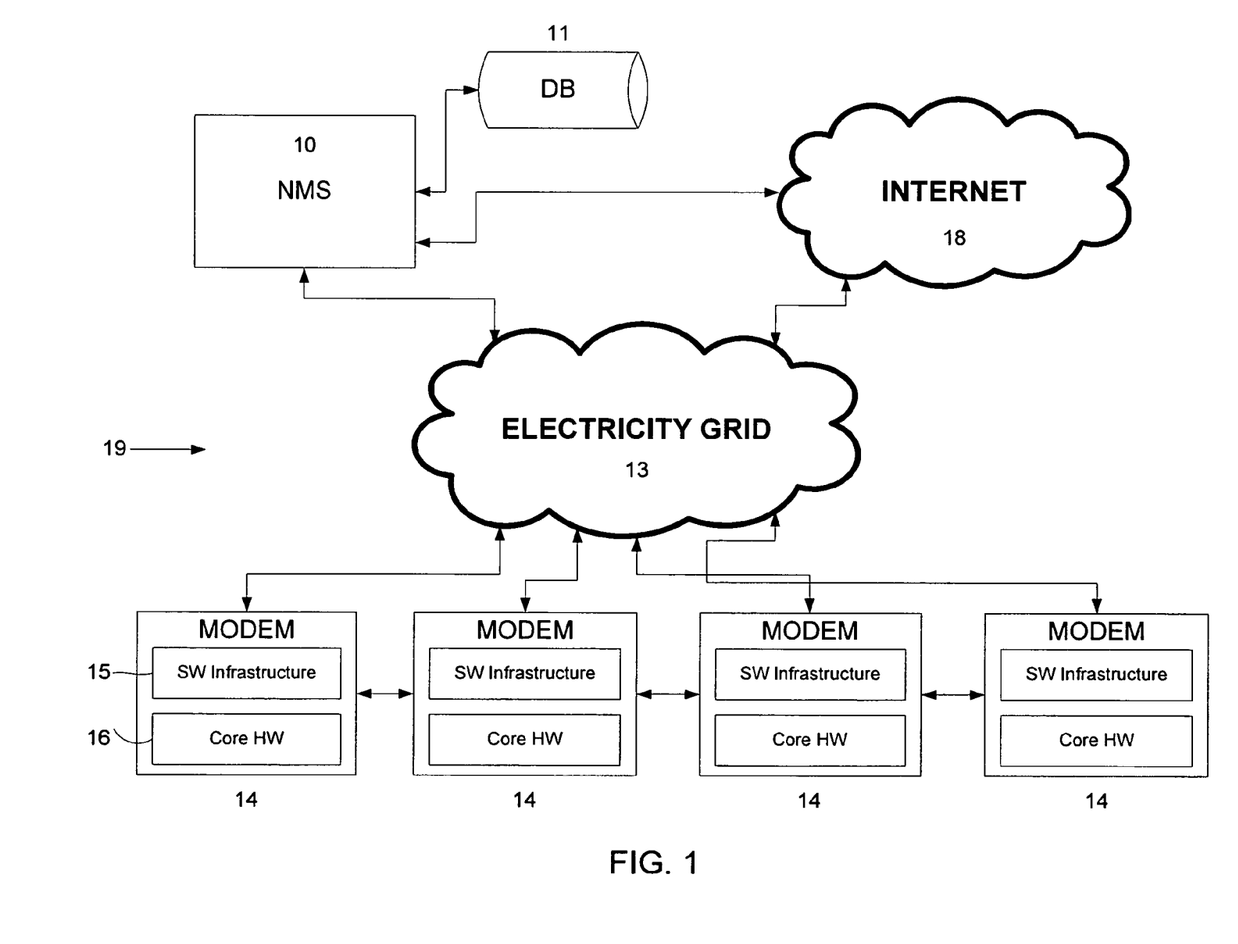
FIG. 1 is a schematic illustration of a PLC Management system, according to some embodiments.

According to some embodiments, a system for providing power line services may include a power line modem fitted with BPL infrastructure hardware components and BPL infrastructure software components, and with a plurality of application specific APIs. The system may further include a network management software (NMS) unit adapted to manage application modules in the power line modem. Reference is now made to FIG. 1, where the system components are illustrated. As can be seen in FIG. 1, the NMS 10 may be coupled to a database 11. The database 11 may include code adapted to manage functionality on a remote communications modem. For example, the NMS may include SW code able to unlock one or more applications on one or more remote communication devices, for example, modems 14. In other examples the NMS may include executable code able to run API(s) on one or more remote communications modems. In some embodiments code may be downloaded or otherwise transferred to one or more communications modems to implement changes in a BPL system. NMS 10 may be connected directly to Electric Grid 13, and/or may be connected to the Internet 18. Where NMS 10 is connected to the Internet, NMS 10 may remotely manage any suitable number of connected communications devices. Grid 13 may be connected to a plurality of communications modems 14, which may be connected to each other to form a Power Line network 19. Communications modem 14 may include a software (SW) infrastructure and core hardware (HW) in order to enable basic power line communications.

Figure 2:
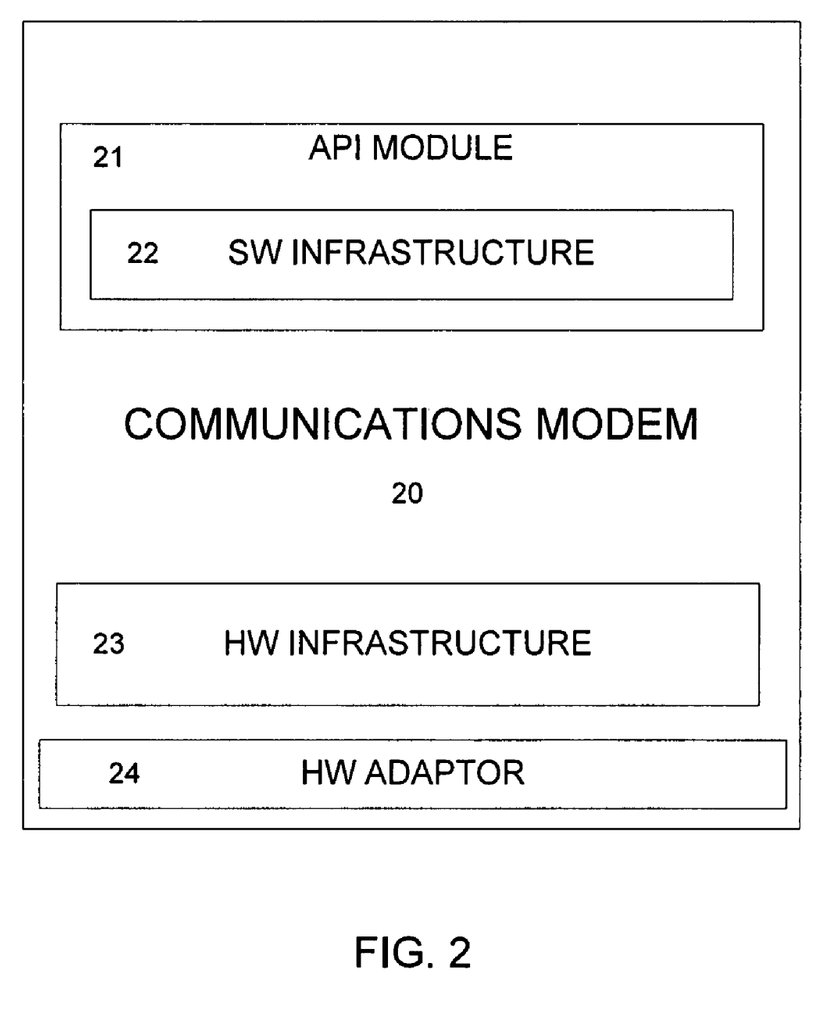
FIG. 2 is a schematic illustration of a communications modem, according to some embodiments.

Reference is now made to FIG. 2, which shows a schematic illustration of communications modem 20. Modem 20 may include an Application Programming Interface (API) module 21, providing suitable interface for enabling modem 20 to run multiple services or applications. API 21 may also include core SW or SW infrastructure for enabling power line communications between multiple modems connected to a grid. Modem 20 may include an HW infrastructure unit 23, containing core HW for enabling power line communications between multiple modems connected to a grid. Modem 20 may include a HW adapter 24, to enable coupling of one or more communications units, components, apparatuses, chips, modems, cables or other suitable mechanisms for communication using a variety of communications technologies, to modem 20.

For example, in some embodiments, modem 20 may be loaded or equipped with a core operation capability, as well as with API's for a number of possible applications or services. Upon installation, the modem may enable connection of a premise or facility to a power line communications network, by allowing basic PLC functionality, for example, to send and receive data from neighboring modems. Upon request, for example, when a Utility decides to change or add a service to be provided to users, the Utility may instruct, via the NMS to install and run one or more services or applications, or to remove or update services or applications. The NMS may accordingly download or otherwise send relevant code, which may or may not include executable code, to one or more modems. This code, when received by the modem, may, for example, enable activation of one or more API's, thereby allowing installation of one or more advanced PLC services or applications. In this way a Utility or system manager may remotely manage advanced services and applications on a per unit basis. Further it may be noted that the functionality changes may be software driven, thereby enabling modems to be remotely managed and modified.

According to some embodiments, a licensing module may be implemented, for example in the NMS, to manage licensing of applications and services. For example, the licensing module may be used to manage which applications have been paid for, for one or more modems, and for a selected period of time. Further the licenses may be renewed, updated, cancelled, extended etc. Such a system may therefore enable intelligent modem management, for example, by remotely managing each modem's functionality using the NMS. Further such a system may enable functional enhancements or modifications to be made remotely, at selected times, thereby providing a dynamic, responsive, and adaptive PLC system.

In other embodiments, for example, a user may attached a HW element, for example, a Zigbee or WiFi chip, to an adaptor unit on the modem, to enable implementation of additional advanced PLC services or applications. As with the above example, implementation of the additional functionality may require sending of relevant SW code by the NMS to the modem, to activate one or more API's, and thereby to implement the required services or applications. In some cases only the HW change may suffice to activate the API(s), whereas in other case a combination of HW and SW changes may be required to implement the required services or applications.

In other embodiments modem 20 may include any core or infrastructure software to enable appropriate BPL system operation. Further, modem 20 may include HW and/or SW components for enabling implementation of a variety of services or applications related to the BPL management system and IP applications such as, for example, QoS; VLAN; Dynamic Routing; Plug and Play; Voice QoS; Layer 2-3 Firewall; Security; Bandwidth Limitation; Auto Provisioning; Remote SW Upgrade; Traffic Counting; DHCP Support; and SNMP Manageable component. In some embodiments the system may include one or more additional modules, for example, HTTP Server (for unit Web control); DHCP server (for home gateway); IPSec/PPPoE client (for home gateway); Special ports support (i.e. HPAV, HP1.0, 802.11, Audio, RS232, USB, IR); Advanced SNMP agent (V3); Second IP stack (for DHCP server; local applications); 802.1Q VLAN support; Internal PLUS VLAN support (VpnPLUS); MPLS support; Advanced PSD notching; RTP suppression; Advanced MIB; Advanced encryption (i.e. key automatic changed); LCD unit; NTP/SNTP support; Unit type special configurations; and Topology oriented patches.

Further components or combinations of components may be implemented. Reference is herein made to patent numbers U.S. Pat. Nos. 6,927,672, 6,995,657, and patent application numbers US2006-0077047, US2005-0008028A1, US 2004-0174851, US2004-0037317, US 2004-0264501, which are incorporated in their entirety herein by reference.

According to some embodiments, a power line service system may include, for example, medium voltage, low voltage, and network management elements. Medium voltage elements may include one or more Concentrator units, Distribution units, Repeater units, inductive/conductive couplers, isolated/non-isolated components, and/or overhead/underground components. Low voltage elements may include one or more Concentrator units, Repeater units, Ethernet Repeater units, network termination units, and/or broadband AMR units. Network management elements may include one or more network management systems, AMR data acquisition systems, and/or grid monitoring systems.

Figure 3:
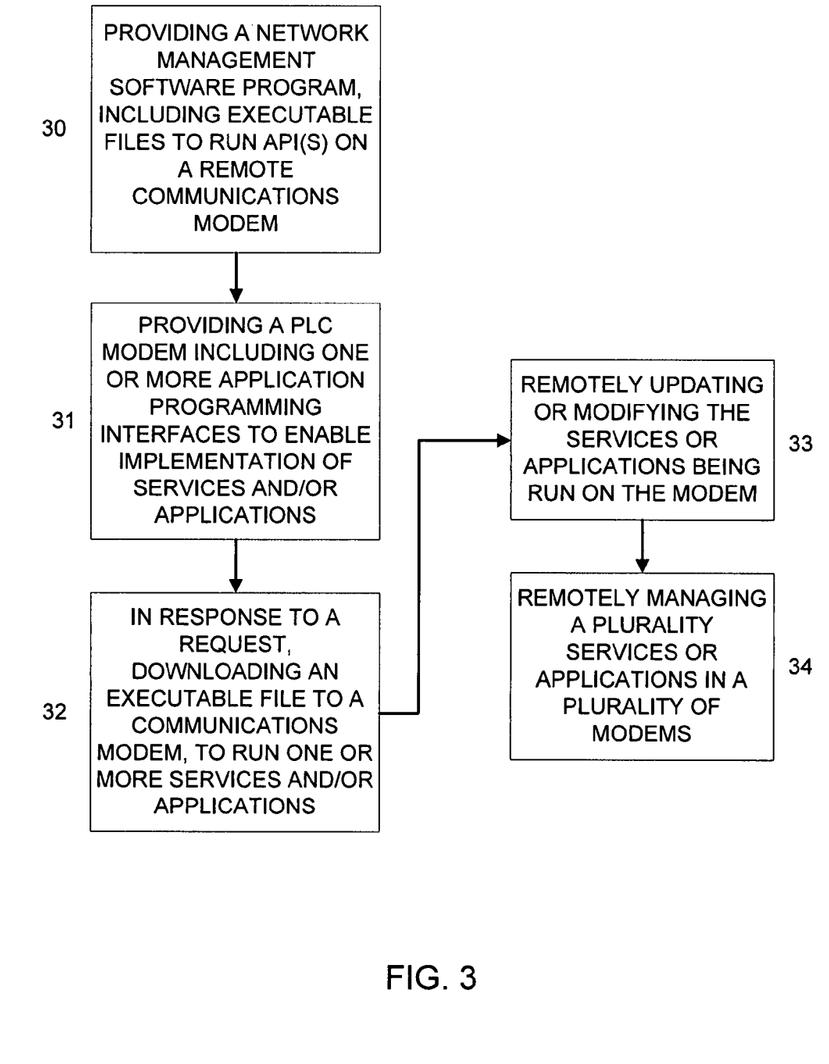
FIG. 3 is a flowchart illustrating a process of advanced service provision, according to some embodiments.

According to some embodiments of the present invention, a method is provided to enable remote implementation of advanced power line services. Reference is now made to FIG. 3, which shows a flow chart describing some stages of a process for enabling advanced PL services to be delivered to users on a customized basis. At stage 30, a network management software (NMS) program or platform may be provided, including code adapted to manage functionality on a remote communications modem. For example, the NMS may include SW code able to unlock applications, and/or executable code able to run API(s). At stage 31, a PLC modem may be provided, including one or more application programming interfaces to enable implementation of services and/or applications upon demand. At stage 32, in response to a request, an executable file may be downloaded from the NMS to the communications modem, to run one or more services and/or applications. At stage 33, the services or applications being run on the modem may be remotely updated or modified, thereby enabling, at stage 34, remote managing of a plurality services or applications in a plurality of modems, using the NMS.

Figure 4:
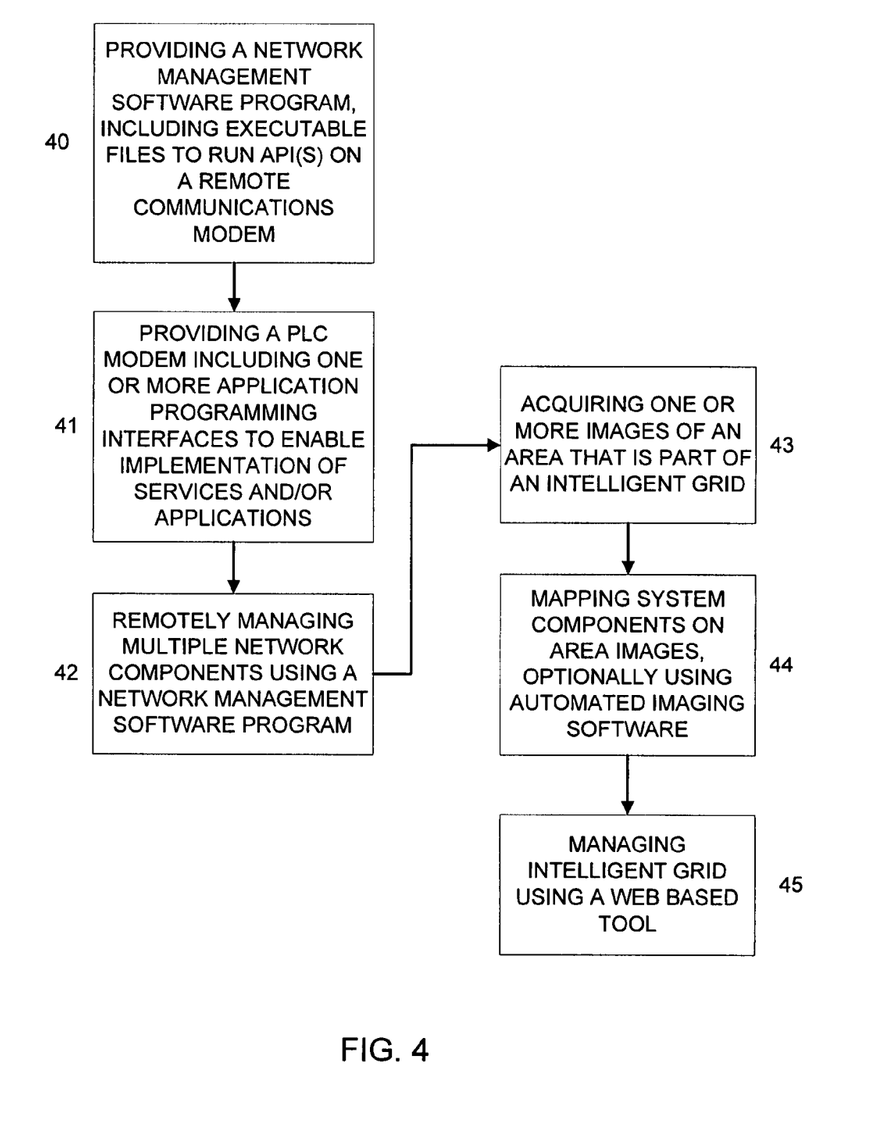
FIG. 4 is a flowchart illustrating a process of Intelligent Grid Implementation, according to some embodiments.

In other embodiment, as can be seen with reference to FIG. 4, a method is provided for setting up and/or managing an Intelligent Electric Grid. The term "Intelligent grid" as used herein refers to an electric grid that may be remotely monitored, programmed, controlled, etc, using data communications transmitted through the electricity wires. Reference is now made to FIG. 4, which shows a flow chart describing some stages of a process for enabling advanced intelligent grid management services to be delivered to users on a customized basis. At stage 40, a network management software (NMS) program may be provided, including executable files to run API(s) on a remote communications modem. At stage 41, a PLC modem may be provided, including one or more application programming interfaces to enable implementation of services and/or applications upon demand. At stage 42, in response to a request, an executable file may be downloaded from the NMS to the communications modem, to run one or more services and/or applications. At stage 43, in some embodiment, one or more images of an area that is part of an intelligent grid may be acquired, for example from an imaging or mapping system (e.g., Google earth). At stage 44 system components may be mapped on area images, optionally using automated imaging software. At stage 45 the selected grid area may be managed using a web based tool. An Intelligent grid, for example, may be able to automatically determine statuses and values of network components, and may generate alarms, alerts or other messages to alert or inform system personnel of situations in the grid.

Such an intelligent grid may include, for example, services including broadband automatic meter reading (AMR), dynamic routing, self learning components, self healing, real time monitoring, smart repetition, load balancing, outage prediction and management, security application management, predictive failure analysis, public service use, voltage monitoring and management, Telemetry applications, including real-time operations, consumption forecasting, distribution automation, and outage notification. Other services may include, for example, automated bandwidth limitation, auto-provisioning, remote software upgrading, traffic counting, load management, auto-negotiation, and notch management. In further embodiments, services may be provided by the BPL system in combination with Wireless, for example, Fire Department (e.g., retrieval of public-building records while in the field); Police Department (e.g., relevant database access while in the field); Emergency Medical Technology (EMT) (e.g., access to medical records while in the field); and use by city municipalities in providing broadband access for public use and internal applications etc.

According to some embodiments, as described above, a management system designed to provide intelligent grid services may be mapped and managed using imaging software that incorporates satellite images, maps etc. For example, a selected area which is part of an Intelligent grid may be photographed by a satellite, and the various system components (e.g., repeaters, concentrator units, modems, lines etc.)

may be mapped on the satellite image. In one embodiment Google Earth software may be used to provide on demand satellite images. Since the various system components (e.g., repeaters, concentrator units, modems, lines etc.) may have physical addresses, a program may be run to automatically map the system components on the satellite images, maps etc. For example, a program may retrieve an image of a neighborhood that is part of an Intelligent grid network, and may map all repeaters in a certain color and/or with a certain icon. So to for other system components, with selected colors and/or objects. Of course, other satellite imaging software or mapping software may be used.

Furthermore a program may be used to add data associated with various system components. For example, the status, history, service level, history, equipment etc. associated with a system component may be added to the Intelligent grid map, such that upon viewing a system component on a map, these additional details may be viewed. In this way, an Intelligent grid may be accurately observed and managed using real time image data. In some embodiments a Web-based system may be used, to enable system management using, for example, Internet Browsing software.

According to some embodiments, components may be mapped on a satellite image, a map, a hybrid satellite/map image or other images. According to some embodiments, the system components may be represented with a key, the key optionally describing the object or icons representing selected component types. Furthermore, a program, for example Internet browser software, may be used to label and/or number the various components.

An intelligent BPL system adapted to manage an electric grid, according to some embodiments, may enable provision of advanced BPL services, for example, may be enabled using automated digital based control and analysis, advanced communication technology (e.g., migration to Internet Protocol), bi-directional broadband communications, on line monitoring, super conductivity (e.g., providing increased storage capacities), and high monitoring resolution up to the subscriber's premises. For example, network management components may enable automated configuring, provisioning, controlling, monitoring and testing of network components. For example, further network management components may enable automated configuration, performance enhancement, accounting management, security monitoring, and fault management.

According to some embodiments, security and surveillance services may be provided, including video camera systems, traffic monitoring and light traffic control. Security services may be provided to enable municipalities, government bodies or other security services easy access from any point in the grid. Security services may further enable implementation of real time video monitoring (e.g., vital utility assets, public facilities, and remote municipal offices), control of critical services (e.g., street lighting, traffic lights, traffic control), call box real time online VoIP monitoring (e.g., safety and emergency services), and remote detection and law enforcement (e.g., WiFi interfacing and hot spot wireless high speed data connections.

According to some embodiments, broadband communication services may be provided, including VoIP, data and video (hereinafter referred to as Triple Play), Smart Home applications, and communications services for MDU/MTU, hotels, campuses and schools etc. Additional services that may be provided include interfacing with any communications infrastructure (e.g., fiber optics, xDSL, WiMAX, 802.11b/g wireless hotspots etc.), quality of service and quality of voice monitoring, Internet and data communications, video on demand, and business wireless hot spots. Further broadband services include providing any electrical socket into a gateway, whether in hotels, manufacturing plants, educational and medical campuses etc. Services provide may include Internet access, bandwidth management, voice priority control, online information sharing, e-learning, video on demand, remote monitoring, facility management, online training, and patient/client data control. Further services provided may include improving electrical utilization (e.g., demand side management, load control, and energy conservation), scene and remote control lighting, managing security alarm interfaces and sensors, access control (e.g., door locks), heating and cooling control and management, and appliance management. In further embodiments BPL Broadband Access may be provided, to enable, for example, Home Networking; HDTV; Video streaming; eGaming; eMusic; MP3, VoD, and Home Movies; Intelligent Home Networking; Intelligent routing; Improve electricity utilization; and Energy conservation.

According to some embodiments, power line services may be provided using web-based technology, thereby enabling systems that are always on, and facilitating sharing of information any time and from anywhere. Services can further be provided using on line monitoring, thereby optimizing energy. According to alternative embodiments, power line service systems may be plug and play based, may operate with low transmission levels, may reach any distance, may enable simultaneous multiple transmissions, Intelligent grid management (e.g., auto configuration), and Quality of Service (QoS) management (e.g., bandwidth management and quality of voice tolling). Power line services systems may be standards and regulations compliant, and coexistence with HomePlug devices and AV devices.

According to other embodiments, advanced services may be provided for the application layer including Outage control services; in home Management; VoIP; IPTV; HDTV; AMR control; Advanced QoS provision; and Client Security services; Further services may include, for example, Automatic meter reading; Voltage control; Equipment monitoring; Remote connect and disconnect; Power outage notification, and Collecting data on time-of-day power demand. Additional services provided may include, for example, Asset Management IT Systems; Asset effectiveness monitoring; automated Fault detection and reporting; Broadband Over Power Line (BPL); Device self-reporting; automated Maintenance; Real-time dynamic load Modeling; Photovoltaic (solar cells); and SCADA network penetration.

The BPL system, according to some embodiments as described above, may require a full separation or unbundling between the Power line communications (PLC) Core layer and the Application layer. This unbundling may enable user-friendly plug-and-play functionality, thereby providing customized enhancements on a per customer or per unit basis. Furthermore this unbundling may allow customers to purchase services or applications according to what they need and when they need them, possibly reducing the price of their customized solution. The basing of pricing decisions on functionality may increase the transparency, logic and efficacy of products or packages provided. Unbundling is also designed to lead to the commoditization of PLC networking, and should provide R&D with greater insight into features and technologies customers want and need.

Accordingly, the "core" layer or area may include generic PLC infrastructure layers that are necessary for the functioning of all relevant services and applications. This core may be fully configurable (e.g., in terms of interface functions, and tasks management) in order that HW plug-ins will be ready to install for any type or number of applications. Each plug-in may include (besides its precedence level) a software version which may define it and will allow dependencies to control it. In addition, plug-ins should be able to be installed and run dynamically (if no core mechanism will be changed due to such installation).

The unbundling between the Core layer and the Application layer may prevent excessive and unnecessary interruptions due to new core software releases, which by nature are time heavy and high cost processes. Instead, software releases may be made for small or side features that are developed, without substantially affecting the core software, and minimizing the down time and release time for core software changes. By offering the overall system architecture or core, and constantly adding new capabilities and applications, the Intelligent BPL Management system may provide "investment protection" because major system components will not become obsolete or need to be replaced quickly.

The BPL system may be managed by the Network Management System (NMS), as described above, which may further include a software component used to view and manage the network components. The NMS may support remote management all system components, including maintaining and updating both core and application software remotely. For example, necessary core software code and/or API data may be fed to the NMS from any Internet or network enabled computer. The NMS may further enable the BPL System to be self-fixing or self-healing.

The modular nature of the BPL System may allow for effective system management, ease of production (i.e. one product for all applications, enabling easier forecasting, cheaper production, etc.), greater flexibility of product mix, faster development, upgrading and time to market, more manageable quality assurance, and more effective customization of applications.

The unbundling of the core architecture and the applications may also enable the selling of software separately from the hardware and related maintenance fees. Software may be sold under a licensing model, wherein the price may depend on the number of users and the length of the license, etc. Software may also be sold by letting customers download and try the products using an online purchasing system with an automated key specific to each customer. Users may be charged for services or applications used, for example, on a personalized basis.

According to some embodiments, the intelligent BPL System may include in-home and/or out-door BPL Devices, and Intelligent electric applications such as: Automatic Meter Reading, Switches, Sensors, Noise analysis, etc. According to some embodiments, the network management system may facilitate plug and play functionality to a variety of applications and services, with each service or application being in the form of an Application Programming Interface (API). Such a BPL System may include easy to setup units with the relevant APIs built in and/or remotely modifiable. Other units and API's, in various combinations, may be used.

According to some embodiments, BPL System products, applications, and management functions may include, for example: Application management, Broadband automatic meter reading (AMR), dynamic routing, self learning components, self healing, real time monitoring, smart repetition, load balancing, outage prediction and management, security and surveillance application management, predictive failure analysis, public service use, voltage monitoring and management, telemetry applications, including real-time operations and applications, consumption forecasting, distribution automation, and outage notification. Other services may include, for example, automated bandwidth limitation, auto-provisioning, remote software upgrading, traffic counting, load management, auto-negotiation, notch management, and Utility management of Applications, which will allow customized management of the above applications.

According to some embodiments, grid services offered may include Automated Meter Reading (AMR) and Instrumentation in the grid; Distribution Monitoring and Control System (DMCS™); and Automated feeder switching and re-closers.

According to some embodiments, services may be implemented in combination with Narrow-band PLC, Cellular networks, Wi-Fi, DSL, 2-Way RF AMR and other suitable communication protocols.

Any combination of the above systems, components, services, applications or steps may be implemented. Further, other systems, components, services, applications and steps or series of steps may be used.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A system for implementing power line communication services, comprising:
   a power line modem fitted with broadband power line (BPL) core hardware components and BPL core software components, said modem further fitted with a plurality of application specific application programming interfaces (APIs); and
   a network management software (NMS) unit adapted to remotely manage application modules in said power line modem.

2. The system of claim 1, wherein said power line modem includes an interface for enabling coupling of one or more hardware components to said modem.

3. The system of claim 2, wherein said interface is adapted to connect said modem to one or more communication components selected from the group consisting of WiFi, Zigbee, Bluetooth, Infrared, and radio frequency identification (RFid).

4. The system of claim 1, wherein said API's are selected from one or more of a group consisting of QOS, automatic meter reading (AMR), VoIP, enhanced TCP, intelligent grid management, videoing, gaming, dynamic routing, self learning, self healing, real time monitoring, smart repetition, load balancing, outage prediction and management, security application management, predictive failure analysis, public service use, voltage monitoring and management, Telemetry applications, real-time operations, consumption forecasting, distribution automation, outage notification, automated bandwidth limitation, auto-provisioning, remote software upgrading, traffic counting, load management, auto-negotiation, and notch management.

5. The system of claim 1, wherein said NMS includes a grid management module to enable intelligent management of an electric grid.

6. The system of claim 1, wherein said NMS includes a licensing module to manage usage of applications by said power line modem.

7. The system of claim 1, wherein said NMS includes a customization module to determine the specific usage of applications on a per user basis.

8. The system of claim 1, wherein said NMS includes executable code adapted to be downloaded to said modems to enable running of said hardware components.

9. The system of claim 1, wherein said NMS includes executable code adapted to be downloaded to said modems to enable running of said software components.

10. A method for implementing power line communication services, comprising:
    providing a power line modem fitted with broadband power line (BPL) core hardware components and BPL core software components, said modem further fitted with a plurality of application specific application programming interfaces (APIs);
    providing a network management software (NMS) unit adapted to remotely manage application modules in said power line modem;
    upon request, downloading an executable file from said NMS to said modem; and
    running said executable file to implement an application.

11. The method of claim 10, wherein said executable file is an intelligent grid management application.

12. The method of claim 10, comprising verifying a licensing arrangement before running said executable file.

13. A method for implementing power line communication services, comprising:
    providing a power line modem fitted with broadband power line (BPL) infrastructure hardware components, an interface for enabling coupling of one or more hardware components to said modem, and BPL infrastructure software components, said modem further fitted with a plurality of application specific application programming interfaces (APIs);
    providing a network management software (NMS) unit adapted to manage application modules in said power line modem;
    coupling a hardware component to said interface;
    downloading an executable file from said NMS to said modem, said executable file adapted to run an application based on usage of said hardware component; and
    running said executable file to implement an application.

14. The method of claim 13, wherein said hardware component is a communication component selected from the group consisting of WiFi, Zigbee, Bluetooth, Infrared, and radio frequency identification (RFid).

15. A method for providing intelligent management of a broadband power line (BPL) grid, comprising:
    providing a power line modem fitted with BPL infrastructure hardware components and BPL infrastructure software components, said modem further fitted with an intelligent grid management application programming interface (API); and
    providing a network management software (NMS) unit adapted to manage said intelligent grid management in said power line modem, said NMS including code adapted to manage an intelligent grid management application in said modem.

16. The method of claim 15, comprising downloading an executable file from said NMS to said modem; and running said executable file to implement said intelligent grid management application.

17. A system for providing intelligent management of a broadband power line (BPL) grid, comprising:
    a power line modem fitted with BPL infrastructure hardware components and BPL infrastructure software components, said modem further fitted with an intelligent grid management application programming interface (API); and
    a network management software (NMS) unit adapted to manage said intelligent grid management in said power line modem, said NMS including code adapted to manage an intelligent grid management application in said modem.

18. The system of claim 17, comprising a licensing module coupled to said NMS, to enable customized management of said intelligent grid management application.

* * * * *